US007110377B2

United States Patent
Hsu et al.

(10) Patent No.: US 7,110,377 B2
(45) Date of Patent: Sep. 19, 2006

(54) DORMANT HANDOFF IN A PACKET DATA NETWORK

(75) Inventors: Raymond T. Hsu, San Diego, CA (US); Arungundram C. Mahendran, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 110 days.

(21) Appl. No.: 10/269,936

(22) Filed: Oct. 10, 2002

(65) Prior Publication Data

US 2004/0071112 A1    Apr. 15, 2004

(51) Int. Cl.
*H04Q 7/00* (2006.01)
(52) U.S. Cl. ....................... 370/331; 455/437
(58) Field of Classification Search ................ 370/252, 370/329, 331, 335, 336, 338, 401; 455/437, 455/440
See application file for complete search history.

(56) References Cited

U.S. PATENT DOCUMENTS

| | | | | |
|---|---|---|---|---|
| 5,729,537 | A * | 3/1998 | Billstrom | 370/329 |
| 6,377,809 | B1 * | 4/2002 | Rezaiifar et al. | 455/455 |
| 6,834,190 | B1 * | 12/2004 | Lee et al. | 455/436 |
| 2002/0041576 | A1 | 4/2002 | Chang et al. | |
| 2002/0068570 | A1 * | 6/2002 | Abrol et al. | 455/438 |
| 2003/0153324 | A1 * | 8/2003 | Veerepalli et al. | 455/453 |
| 2004/0062227 | A1 * | 4/2004 | Sayeedi | 370/350 |

FOREIGN PATENT DOCUMENTS

WO    0147296    6/2001

OTHER PUBLICATIONS

Kempf, "Dormant Mode Host Alerting ("IP Paging") Problem Statement", Jun. 2001, Network Working Group, RFC 3132, pp. 1-3.*
Faccin, S., et al. "Dormant Mode Handover Support in Mobile Networks," Seamoby Working Group, XP002225424, Sep. 17, 2001.
Kempf, J., "Dormant Mode Host Alerting ("IP Paging") Problem Statement," Sun Microsystems, RFC 3132, Jun. 2001.

* cited by examiner

*Primary Examiner*—Steven Nguyen
*Assistant Examiner*—Christine Ng
(74) *Attorney, Agent, or Firm*—Kam T. Tam; Thien Nguyen; Phil Wadsworth

(57) ABSTRACT

Mobile unassisted dormant handoff in a wireless communication system supporting packet data communications. While in a dormant mode, a mobile node may change packet zones, wherein different packet zones are serviced by at least one different infrastructure element, without identifying the change to the system. The change in packet zone does not necessarily trigger establishment of a communication path for the mobile node until there is packet data ready for communication. In one embodiment, mobile assistance is adapted to the system, and is disabled at the mobile node by an indication in a system parameter message transmitted by the system and received by the mobile node.

4 Claims, 9 Drawing Sheets

US 7,110,377 B2

DORMANT HANDOFF IN A PACKET DATA NETWORK

BACKGROUND

1. Field

The present invention relates generally to dormant handoff in a wireless communication network supporting packet data transmissions, and more specifically, to mobile-unassisted dormant handoff.

2. Background

For data transmissions, such as packet data transmissions, data is transmitted via the network using Internet Protocol (IP) addressing, referred to as Mobile IP routing. IP addresses are used to route packets from a source endpoint to a destination by allowing routers to forward packets from incoming network interfaces to outbound interfaces according to routing tables. The routing tables typically maintain the next-hop (outbound interface) information for each destination IP address, according to the number of networks to which that IP address is connected. Thus, the IP address typically carries with it information that specifies the IP node's point of attachment. For a communication network, this involves forming a series of connections to form a path from the source to the destination. Specifically, a Point-to-Point Protocol (PPP) is used to establish the path.

The network is typically divided into multiple packet zones wherein each packet zone services a particular geographical area. As a Mobile Station (MS) or other mobile node moves throughout the network, the MS may move from one packet zone to another. Such movement may require the MS to establish a new path via the current packet zone and tear down a previous path. This process is referred to as handoff.

For a given MS, when packet data is actively communicated via a given path, handoff is accomplished by use of the signaling messages transmitted between the MS and the network for the packet data activity. During dormant periods when the path is not being used for packet data activity, the MS typically assists the handoff by providing signaling information that identifies the current location of the MS. Handoff during a dormant period is referred to as "dormant handoff," and the provision of information by the MS during dormant handoff is referred to as "mobile-assisted" dormant handoff. In response to the signaling information, the network establishes a new path and tears down the previous path.

Dormant handoff may occur many times before any packet data is ready for communication to or from the MS. In this situation, paths are established and torn down any number of times, wasting network resources. Additionally, the transmission of the signaling message from the MS associated with establishment of each new path uses wireless resources.

There is a need therefore, to provide efficient dormant handoff that reduces the use of network IP resources. There is further a need to provide efficient dormant handoff without mobile assistance that reduces the demands on the network wireless resources.

DETAILED DESCRIPTION

As the demand for increased services, such as data services and other Internet Protocol (IP) services, increases the complexity of establishing and maintaining these services for mobile, i.e., wireless, users increases. While a mobile user is not accessing such services continually as traveling over a geographical area, often times the connections are maintained so as to facilitate such services on an as needed basis. For example, a Point-to-Point Protocol (PPP) connection may be established and maintained for a given mobile user even when that user is not receiving data service. While no data is communicated, the mobile user may be in a dormant mode. In one system, a mobile in dormant mode sends an Origination message, as defined for cdma2000, every time it roams into a different packet zone. The Origination messages are primarily used to update the various connections between the Packet Control Function (PCF) node and the Packet Data Service Node (PDSN). The Origination messages may introduce interference on an access channel, as any number of mobiles, in dormant mode, may also be crossing packet zone boundaries. The following embodiments reduce the complexity and waste of resources while a mobile is in dormant mode using a process referred to as "Mobile-Unassisted Dormant Handoff."

As an example, a system utilizing Code Division Multiple Access (CDMA) techniques is the cdma2000 ITU-R Radio Transmission Technology (RTT) Candidate Submission (referred to herein as cdma2000), issued by the TIA. The standard for cdma2000 is given in the draft versions of IS-2000 and has been approved by the TIA and 3GPP2. Another CDMA standard is the W-CDMA standard, as embodied in 3rd Generation Partnership Project "3GPP", Document Nos. 3G TS 25.211, 3G TS 25.212, 3G TS 25.213, and 3G TS 25.214.

Figure 1:
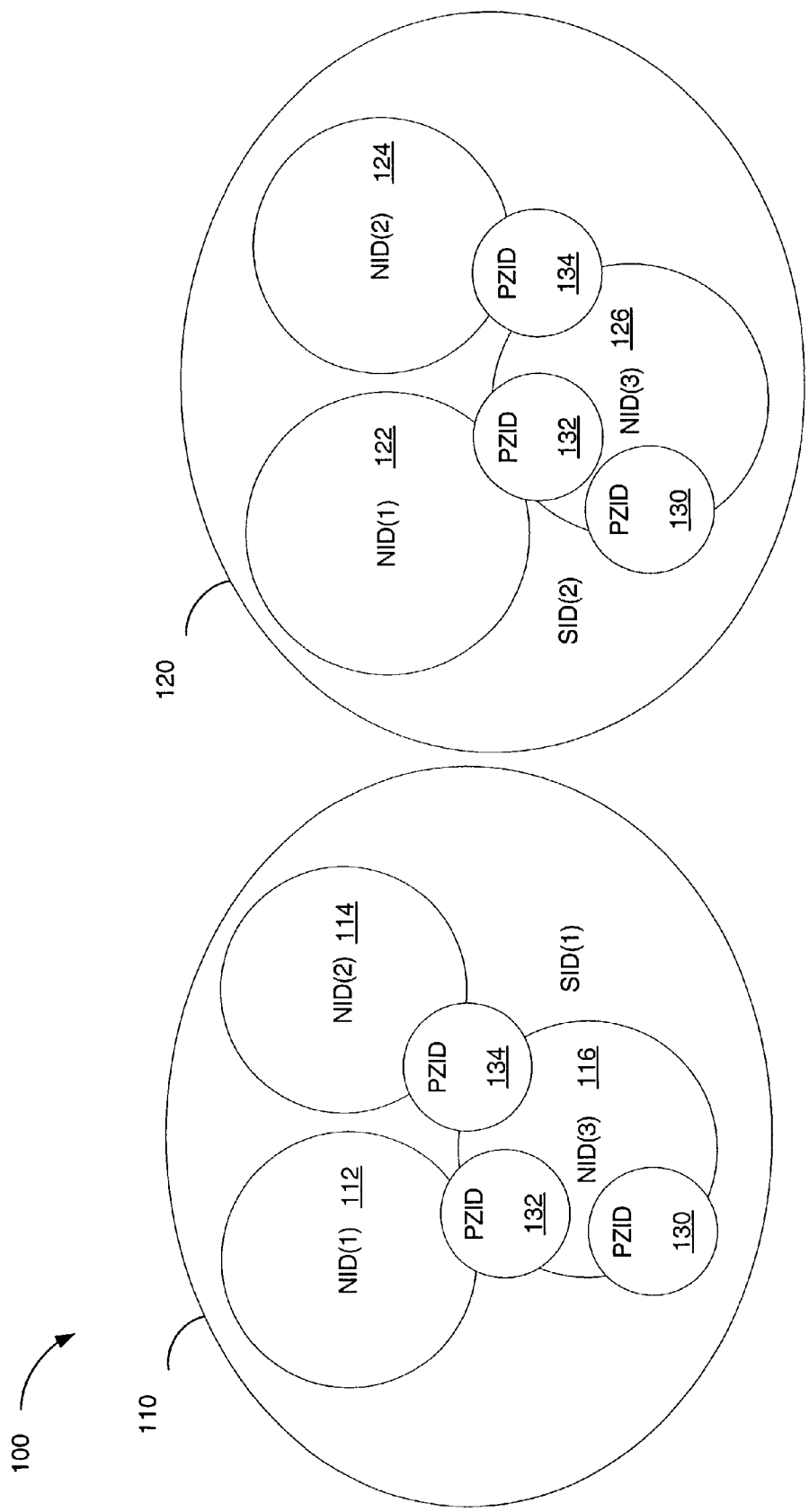
FIG. 1 is a block diagram of a data communication system.

FIG. 1 illustrates a packet data network 100 according to one embodiment. Note that alternate embodiments may have different terminology for similar functional units, and may incorporate different configurations of components and functional units. For the present discussion, the network 100 of FIG. 1, and other detailed figures, will be used for defining a path; however, alternate embodiments may define a path according to the specific configuration and functions used therein. The packet data system 100 includes two System Identification (SID) zones 110, 120, each having multiple Network Identification (NID) zones 112, 114, 116, 122, 124, 126. The SID/NID are used in voice systems and generally identify a serving area. For example, an MSC serving area may be associated with a pair of (SID, NID) values.

Figure 2:
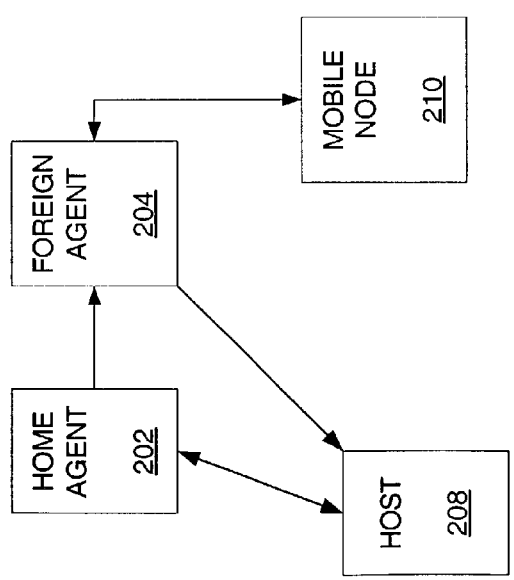
FIG. 2 is a block diagram of a data communication system illustrating multiple packet zones.

For packet data communications within a system supporting packet data communications, such as system 100 of FIG. 1, mobile IP communication and connectivity are described in "IP Mobility Support" by C. Perkins, dated October 1996, and referred to as RFC 2002. FIG. 2 illustrates the flow of information in datagrams for a given Mobile Node (MN) 210 or Mobile Station (MS) according to mobile IP. As illustrated, each mobile node 210 is a host or router that changes its point of attachment from one network or subnetwork to another. A mobile node may change location without changing IP address; and may continue to communicate with other Internet nodes at any location using that IP address, when link-layer connectivity to the point of attachment is available. Each mobile node 210 has an associated home agent 202. The home agent 202 is a router on the mobile node's home network which tunnels datagrams for delivery to the mobile node 210 when the mobile node 210 is away from home, and maintains current location information for the mobile node 210.

A foreign agent 204 is a router on a mobile node's visited network which provides routing services to the mobile node 210 while registered. The foreign agent 204 detunnels and delivers datagrams to the mobile node 210 that were tunneled by the mobile node's home agent 202. For datagrams sent by a mobile node 210, the foreign agent 204 may serve as a default router for registered mobile nodes.

A mobile node 210 is given a long-term IP address on a home network. This home address is administered in the same way as a "permanent" IP address is provided to a stationary host. When away from the home network, a "care-of address" is associated with the mobile node 210 and reflects the mobile node's current point of attachment. The mobile node 210 uses the home address as the source address of all IP datagrams that it sends. While away from home, the mobile node 210 registers the care-of address with the home agent 202. Depending on method of attachment, the mobile node 210 will register either directly with its home agent 202, or through a foreign agent 204 which forwards the registration to the home agent 202.

Figure 3:
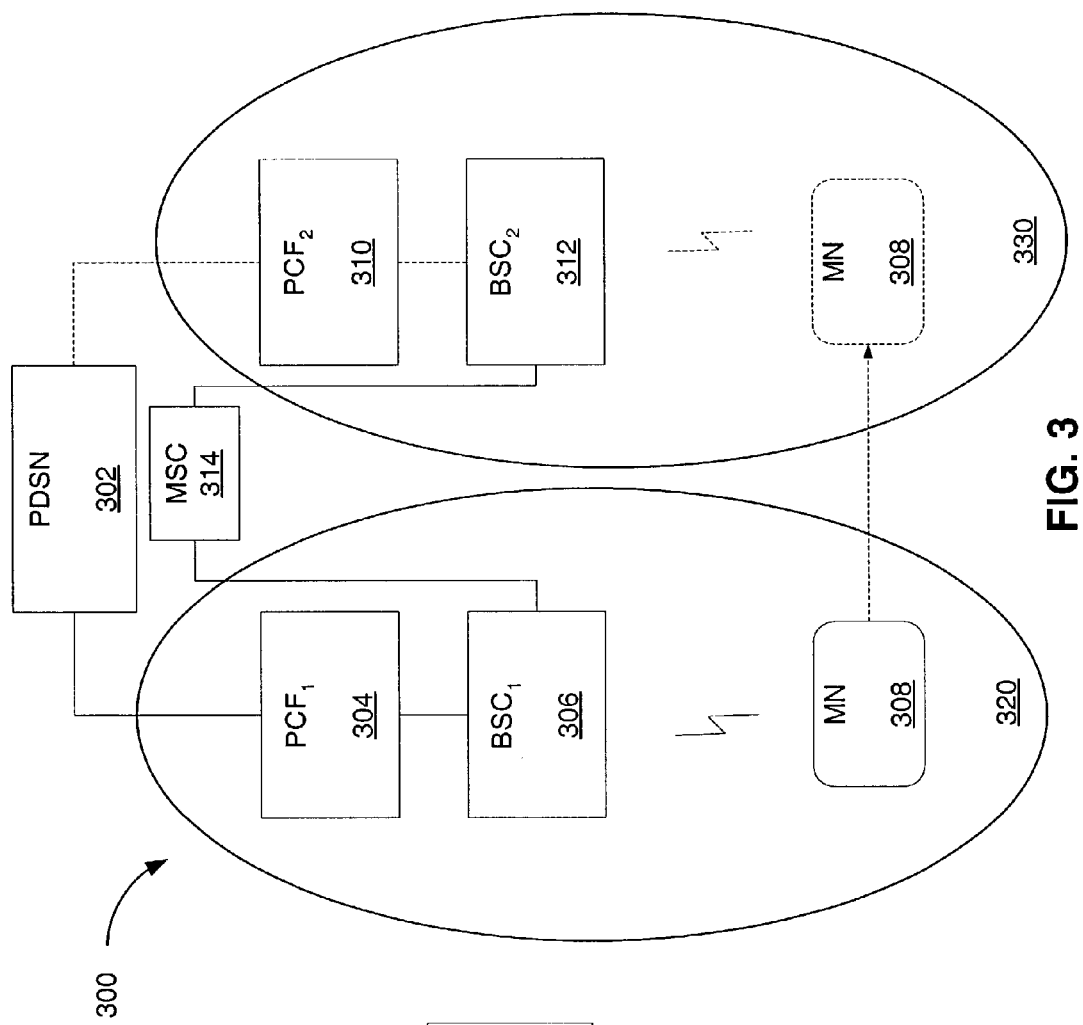
FIG. 3 is a detailed portion of a data communication system.

For the system 100 of FIG. 1, a typical configuration 300 within each PZID is illustrated in FIG. 3. A Packet Data Service Node (PDSN) 302 is coupled to Packet Control Function (PCF) Nodes 304 and 310, which are each coupled to Base Station Controllers (BSCs) $BSC_1$ 306 and $BSC_2$ 312, respectively. A first communication path is defined by PDSN 302 to $PCF_1$ 304 to $BSC_1$ 306, wherein the $BSC_1$ 306 communicates with the MN 308 within PZID 320 via an air interface. When the Mobile Node (MN) 308 moves to another PZID, such as PZID 330, a new path is established for packet data communications defined by PDSN 302 to $PCF_2$ 310 to $BSC_2$ 312, wherein the $BSC_2$ 312 communicates with the MN 308 within PZID 320 via an air interface. The path connections from PDSN 302 to $PCF_1$ 304 and $PCF_2$ 310 define A10 connections. The path connections from $PCF_1$ 304 to $BSC_1$ 306 and from $PCF_2$ 310 to $BSC_2$ 312 define A8 connections. A PPP connection is established between the MN 308 and the PDSN 302. If the MN changes PDSN, a new PPP connection is established between the MN and the new PDSN.

For calls supporting packet data services, a Packet Data Serving Node (PDSN) exists that interfaces between the transmission of the data in the fixed network and the transmission of the data over the air interface. The PDSN interfaces to the BS through a Packet Control Function (PCF), which may or may not be co-located with the BS. For the packet data system illustrated in FIG. 3, an MN 308 may operate in one of at least three states or modes.

Figure 4:
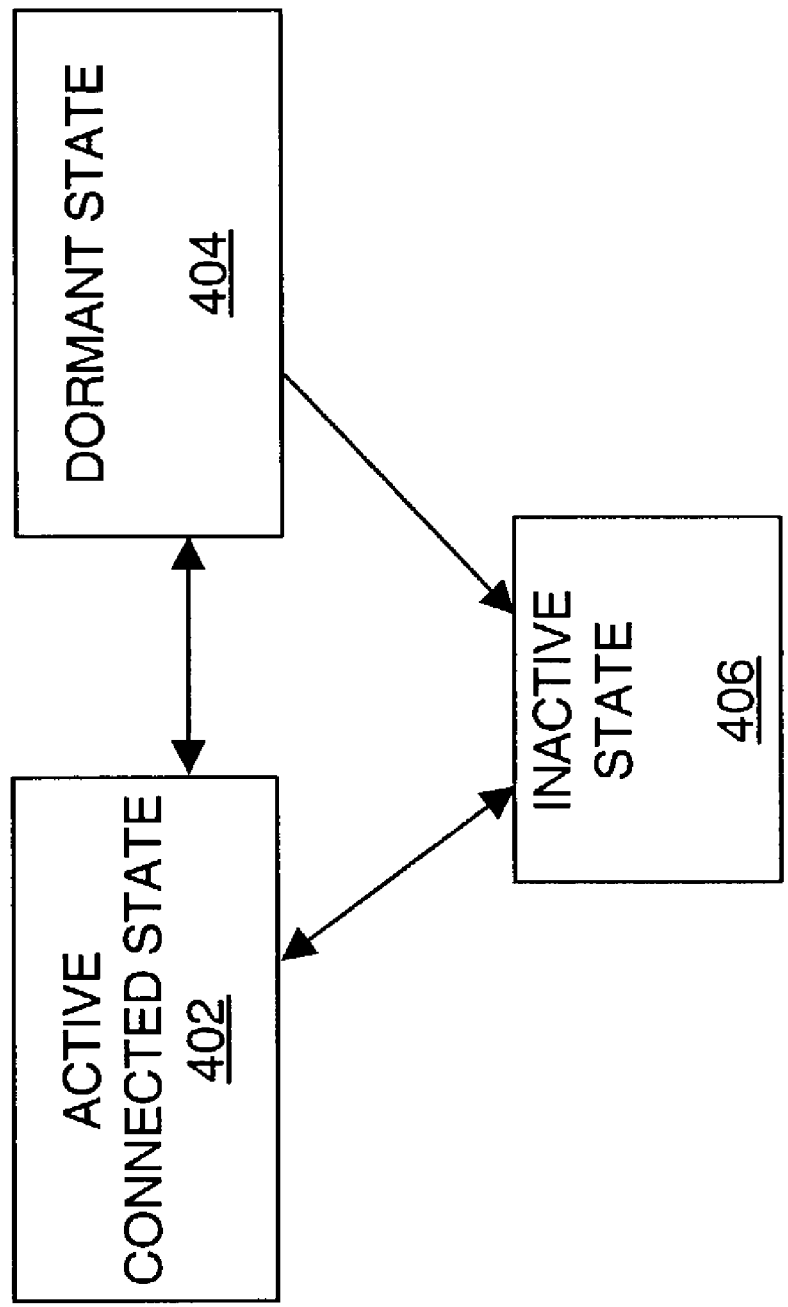
FIG. 4 is a state diagram illustrating operation of a mobile node in a communication system.

As illustrated in FIG. 4, there are three packet data service states: Active/Connected State 402, Dormant State 404, and Inactive State 406. In the Active/Connected State 402, a physical traffic channel exists between the mobile station and the base station, and either side may send data. In the Dormant State 404, no physical traffic channel exists between the mobile station and the base station, but the PPP link between the mobile station and the PDSN is maintained. In the Inactive State 406, there is no traffic channel between the mobile station and the base station and no PPP link between the mobile station and the PDSN. FIG. 4 illustrates the transitions between states. The A8 connection is maintained during the Active/Connected State and released during transition to Dormant or Null/Inactive State. The A10 connection is maintained during the Active/Connected and the Dormant State. The A10 connection is terminated when the mobile station is in the Inactive State 406.

As part of the support for the Dormant State 404, the air interface supports a Data Ready to Send (DRS) indicator that is used on Origination. When a mobile node sends an origination request with a packet data service option specified, it will include the Data Ready to Send (DRS) bit. This indicator will be set to 1 on initial call setup and when the terminal wishes to transition from Dormant State 404 to an Active State 402 indicating that there is data to be sent and a corresponding request for establishment of a traffic channel. The DRS bit will be set to 0 to indicate that the terminal has transitioned a packet zone boundary while dormant, and is sending the origination request to update the network as to the current location.

On receipt of an Origination message with the DRS bit set to 1, the BSC will initiate the call setup procedure. The call setup procedure establishes the path for a packet data communication to the current location of the mobile node. Path establishment typically results in the establishment of a traffic channel, and the establishment of the corresponding A8 and A10 connections. When the BSC receives an Origination message with the DRS bit set to 0, the BSC and/or PCF will update the A10 connection between the PCF and the PDSN.

When the MN 308 is in dormant mode no packet data communications are processed with the PDSN 302, however, the MN 308 continues to send "Origination" messages each time the MN 308 moves into a different packet zone. The Origination messages are primarily used to update the A10 connection between the PCF 304, 310 and the PDSN 302.

The MN 308 identifies a packet zone change by an identification of the PACKET_ZONE_ID (PZID) contained in a "Systems Parameters" message transmitted periodically by the BSC 306, 312. When the MN 308 identifies a change in PZID, the MN 308 sends an Origination message identifying the current location and current packet zone. The Origination messages may cause a lot of interference on the access channel used to establish radio connection, as there may be any number of mobiles nodes, in dormant mode, crossing packet zone boundaries.

According to one embodiment, the mobile node in dormant mode may avoid sending an Origination message every time it moves into a new packet zone by a process referred to as "Mobile-Unassisted Dormant Handoff." When the MN 308 is in dormant mode, and there is no data pending for communication from the PDSN 302, the MN 308 does not need to send an Origination message on movement to a new packet zone and the last used communication path (i.e., A10 connection) is maintained. When there is data destined for the MN, the PDSN 302 sends the data communication using the last used A10 connection.

According to the present embodiment, while in a dormant state or mode, the mobile node does not send an Origination message on a packet zone change. Rather, the location of the mobile node is updated when there is incoming data to the mobile node, or when the mobile node has data to send. In other words, at the time when the system receives data (say from the Internet), which is destined for the mobile node, the system attempts to locate the mobile node.

For data communications from the mobile node to the system, when the mobile node transitions to the active state and has data to send, the mobile node sends an Origination message with the DRS bit set to 1. The mobile node, in this case, follows a typical call flow, such as defined in the cdma2000 standards.

For data communications from the system to the mobile node, when a mobile node is in a dormant state and there is incoming data to the mobile, the data is forwarded from the serving PDSN to the serving PCF on the current active A10 connection (i.e., last used A10 connection). While in dormant mode, the mobile node does not send location updates via Origination messages each time a new packet zone is entered. Therefore, the location of the mobile node is not known when incoming data is ready for communication. The mobile node may still be in the same packet zone or may be in a different packet zone.

Consider the configuration illustrated in FIG. 3, wherein a PDSN 302 supports multiple PCFs, specifically $PCF_1$ 304 and $PCF_2$ 310. The Mobile Node (MN) 308 has established a packet data communication path with the PDSN 302 via the path on the left. The path is defined within packet zone 320 by: the A10 connection between PDSN 302 and the "serving" PCF, which is $PCF_1$ 304; the A8 connection between $PCF_1$ 304 and $BSC_1$ 306; and the radio connection between $BSC_1$ 206 and MN 308. The term "serving" refers to the infrastructure element(s) and path established for the last active packet data communication. As the MN 308 moves to a different packet zone, such as packet zone 330, a new path should be established for processing packet data communications. The new path is defined by: an A10 connection between the PDSN 302 and a "target" PCF, which is $PCF_2$ 310; an A8 connection between $PCF_2$ 310 and $BSC_2$ 312; and a radio connection between $BSC_2$ 312 and MN 308. The term "target" refers to the infrastructure element(s) and path which is desired to facilitate a new packet data communication.

When there is packet data ready for communication to the MN 308, the serving PCF, which is $PCF_1$ 304, only knows the location of the MN 308 for the last active packet data communication. The packet data is processed from PDSN 302 via the serving path, i.e., via $PCF_1$ 304. The infrastructure elements of the serving path initiate a page to the MN 308. If the MN 308 has moved to a new packet zone, such as packet zone 330, the MN 308 will not respond to the page message. The serving BSC, 306 then requests the MSC 314 to page the mobile. The MSC 314 may: direct specific BSC(s) to page the MN 308; initiate a flood page in a given serving area; or may request another MSC (not shown) to page the MN 308. Flood page is used if the MSC does not know where the MN is, but needs to page it; in this case, the MSC would command all BSCs (that are in the MSC serving area) to page the MN. Flood page is not common because most of time the MSC knows where the MN is via the over-the-air registration procedures, such as defined in the cdma2000 standards; in this case, the MSC only needs to command a particular BSC to page the MN. On receipt of the page, the MN 308 responds to the page from the new packet zone 330 via the target PCF and BSC, $PCF_2$ 310 and $BSC_2$ 312, respectively. The MSC 314 authorizes the establishment of a traffic channel for the MN 308. In response to the MSC 314 authorization, the target BSC ($BSC_2$ 312) creates a new A8 connection to the target PCF ($PCF_2$ 310), which in turn creates a new A10 with the PDSN 302.

If both the PCFs, the serving PCF ($PCF_1$ 304) and the target PCF ($PCF_2$ 310) are connected to the same PDSN 302, the serving path is torn down. In this case the old A10 connection between PDSN 302 and the Serving PCF is removed when the new A10 connection with the target PCF is established. All new packet data intended for the MN 308 is processed via the target path on the right hand side.

If both the PCFs, target and serving, are connected to different PDSNs, then link layer (PPP) re-establishment and Mobile IP re-registration is performed between the MN 308 and the target PDSN (PDSN connected to target PCF). Also, a new A10 connection is established between target PCF and the target PDSN. The old A10 connection between serving PCF and the serving PDSN is torn down or dropped when a registration lifetime timer (Trp) expires.

Figure 5:
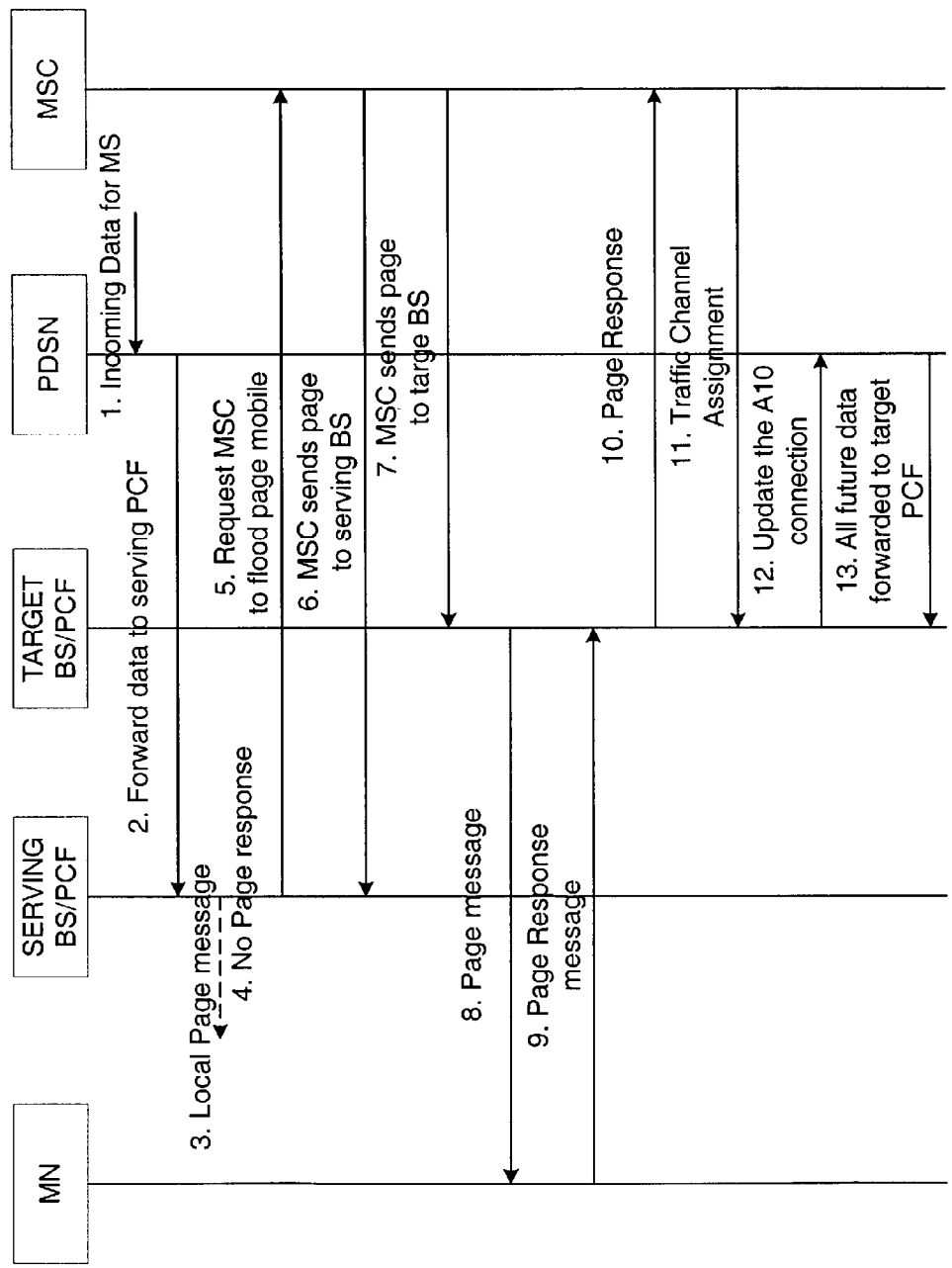
FIG. 5 is a diagram illustrating call flow in a communication system.

FIG. 5 illustrates call flow for the case when the MN 308 moves to a new packet zone 330, which is served by the same PDSN 302 as the prior packet zone 320. As indicated hereinabove, the serving path is in packet zone 320, while the target path is in packet zone 330. Assuming the MN 308 has performed registration—, before the packet data session transitioned to dormant mode, and that the A10 connection between the Serving PCF and the PDSN has not expired. The call flow is defined as follows.

1) The PDSN 302 receives packet data targeted for the MN 308.
2) The PDSN 302 forwards the packet data to the Serving PCF ($PCF_1$ 304) through the existing A10 connection, i.e., via the serving path.
3) The serving BSC ($BSC_1$ 306) on the serving path pages the MN 308.
4) As the MN 308 has moved to another packet zone 330, there is no page response from the MN from within packet zone 320.
5) The serving BSC ($BSC_1$ 306) requests the MSC 314 to page the MN 308 and setup a traffic channel.
6&7) The MSC 314 initiates a page to the MN 308 to setup a traffic channel.
8) The target BSC ($BSC_2$ 312) pages the MN 308 via the radio connection, i.e., Over The Air (OTA).
9) The MN 308 responds to the page from the new packet zone 330.
10) The page-response is forwarded by the target BSC ($BSC_2$ 312) to the MSC 314.
11) The MSC 314 authorizes the target BSC ($BSC_2$ 312) to assign a traffic channel to the MN 308.
12) The A10 connection to the PDSN 302 is updated by the target PCF ($PCF_2$ 310).
13) All future data to the MN 308 while in packet zone 330 go through the target PCF ($PCF_2$ 310).

Figure 6:
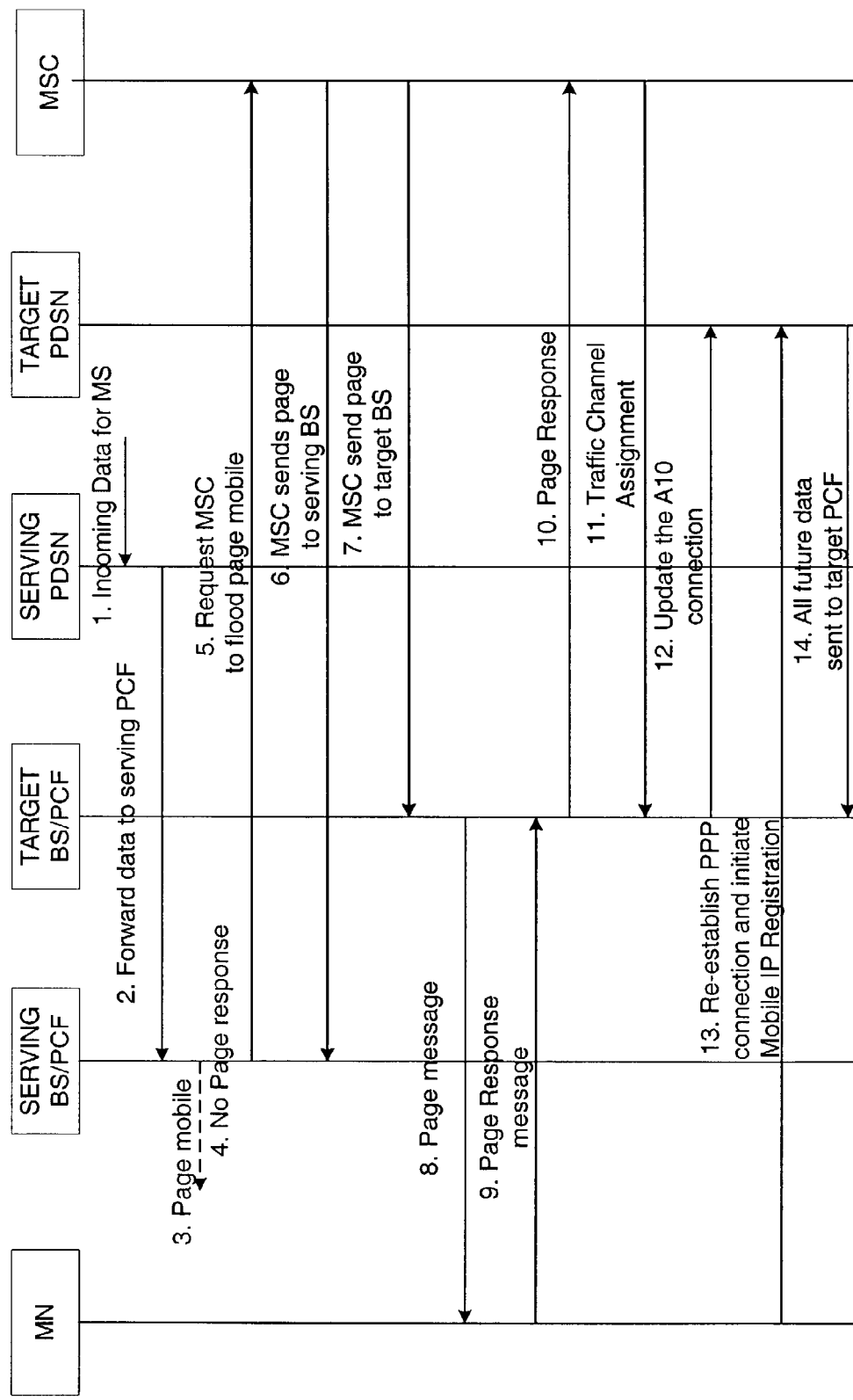
FIG. 6 is a diagram illustrating call flow in a communication system.

The MN 308 may move to a new packet zone wherein the new packet zone is not served by PDSN 302, but rather is served by a target PDSN (not shown). In this case, the target path will be established to include the new PDSN. FIG. 6 illustrates call flow for this case when the MN 308 moves to a new packet zone, which is served by a different PDSN (not shown).

1) The PDSN 302 receives packet data for the MN 308.
2) The PDSN 302 forwards the packet data to the serving PCF (PCF$_1$ 304) through the existing A10 connection on the serving path.
3) The BSC$_1$ 306 pages the MN 308.
4) There is no page response from the MN 308 from within packet zone 320.
5) The serving BSC (BSC$_1$ 306) requests the MSC 314 to page the MN 308 and setup a traffic channel.
6&7) The MSC 314 initiates a page to the MN 308 to setup a traffic channel.
8) The target BSC (not shown) in the new packet zone (not shown) pages the MN 308 OTA.
9) The MN 308 responds to the page in the new packet zone.
10) The page-response is forwarded by the target BSC to the MSC 314.
11) The MSC 314 authorizes the target BSC to assign a traffic channel to the MN 308.
12) An A10 connection to the PDSN is established by the target PCF on the target path, i.e. associated with the target BSC.
13) The MN 308 re-establishes a PPP state with the target PDSN and also performs Mobile IP registration.
14) All future packet data go through the target PDSN and target PCF while the MN 308 is in the new packet zone. The old A10 connection on the serving path between the serving PDSN 302 and serving PCF (PCF$_1$ 304) expires when registration lifetime timer (Trp) expires.

Figure 7:
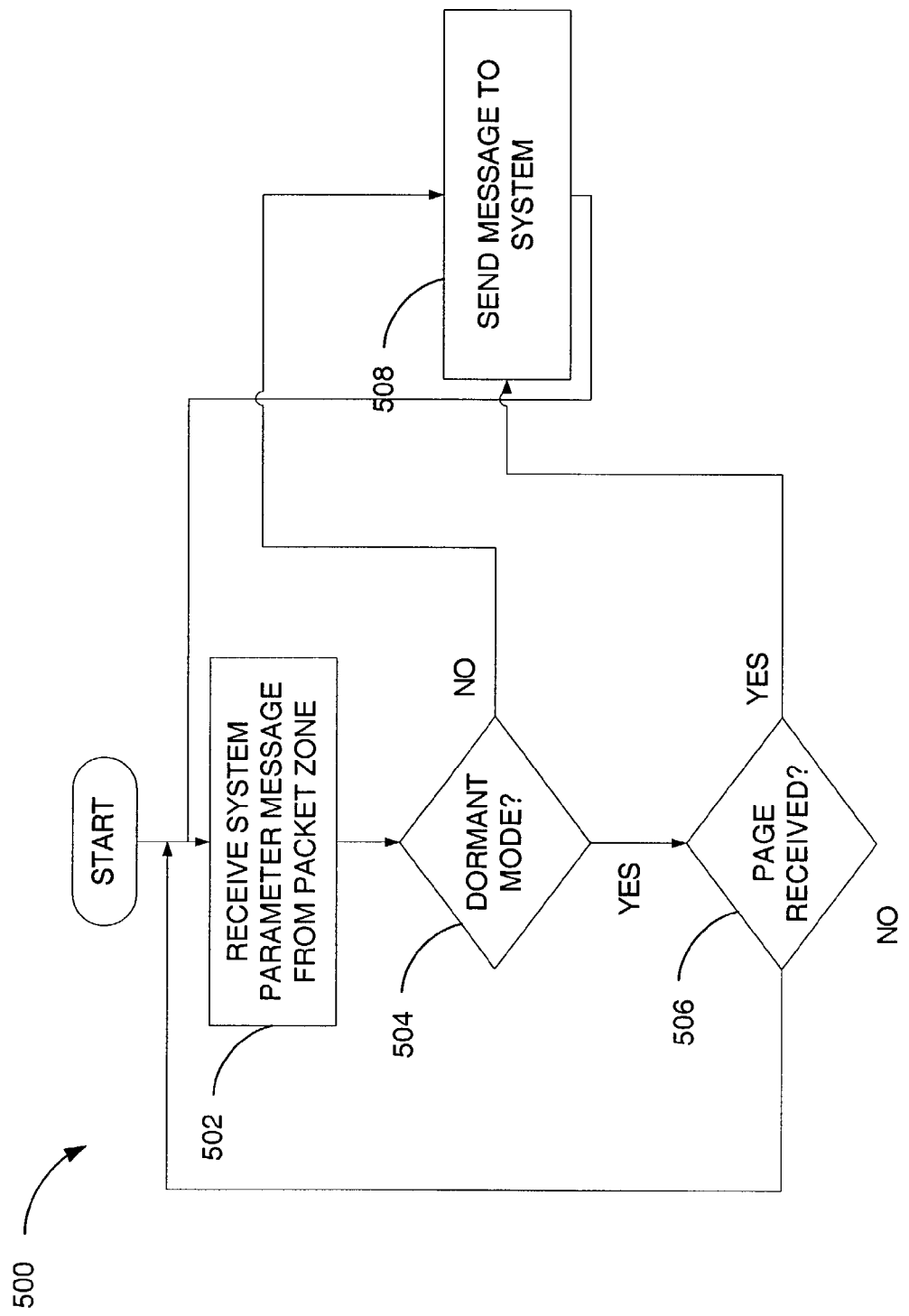
FIG. 7 is a flow diagram of message processing at a mobile node.

FIG. 7 illustrates processing 500 at the MN 308 wherein the MN 308 receives a system parameter message at step 502. For dormant mode (step 504) processing continues to step 506 to determine if a page is received at the MN 308. Else if the MN 308 is not in dormant mode, processing continues to step 508 to send a message to the system identifying the location of the MN 308, such as an origination message. Note alternate embodiments may provide alternate messages and/or methods for the MN 308 to identify a new location. From step 506 if no page is received, then the MN 308 stays in dormant mode, else, the MN 308 responds to the page at step 508.

Figure 8:
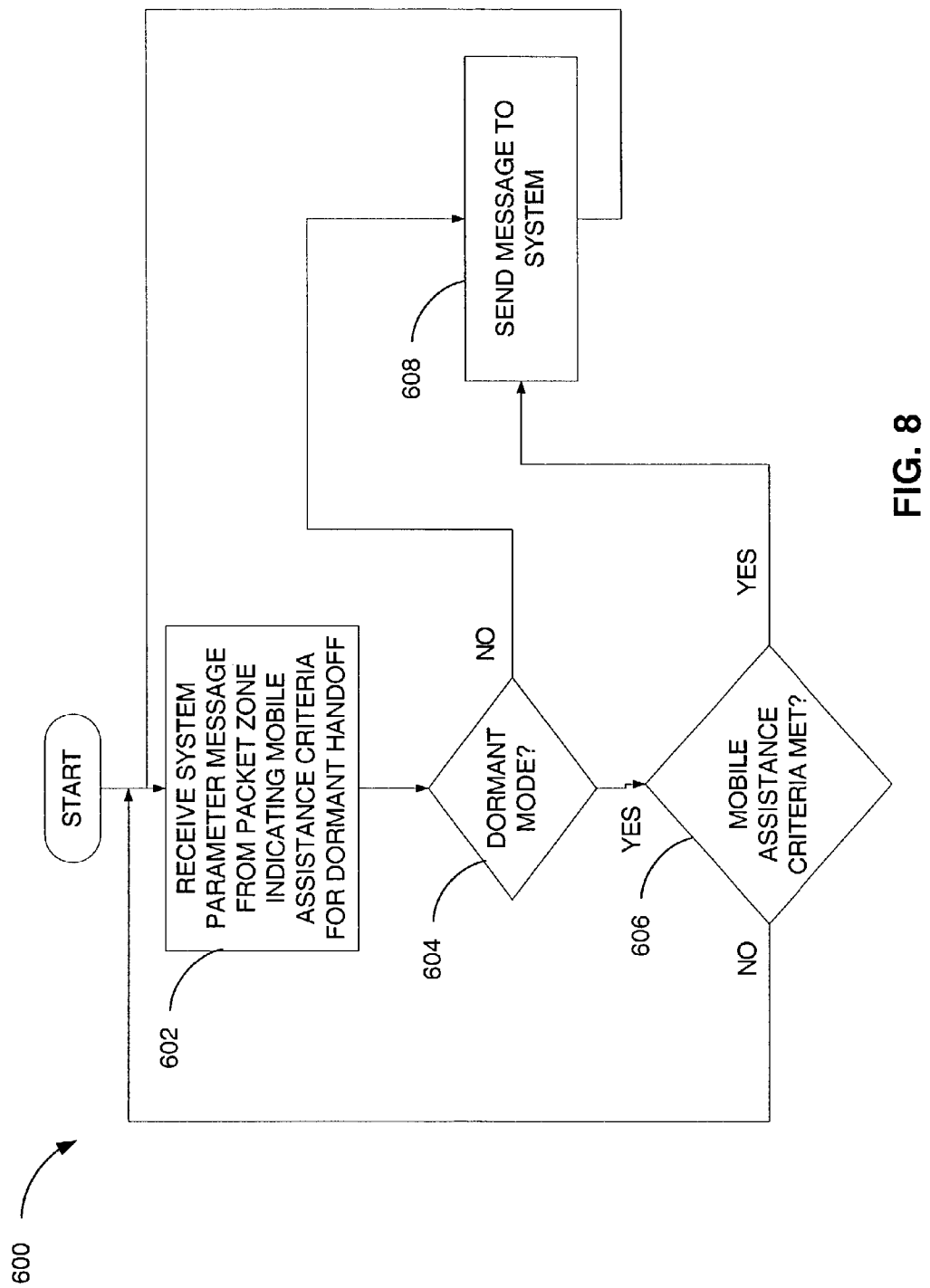
FIG. 8 is a flow diagram of processing at the mobile node wherein the system parameters message identifies a mobile assistance criteria for dormant handoff.

FIG. 8 illustrates processing 600 at the MN 308 when the system parameters message identifies a mobile assistance criteria for dormant handoff. The mobile assistance criteria may specify the criteria for identifying the MN 308 location, such as an origination message to the system. The MN 308 receives a system parameters message at step 602. For dormant mode (step 604) processing continues to step 606 to determine if the mobile assistance criteria is met. When the mobile assistance criteria is met, the MN 308 identifies the current location, such as by sending a message to the system at step 608.

Figure 10:
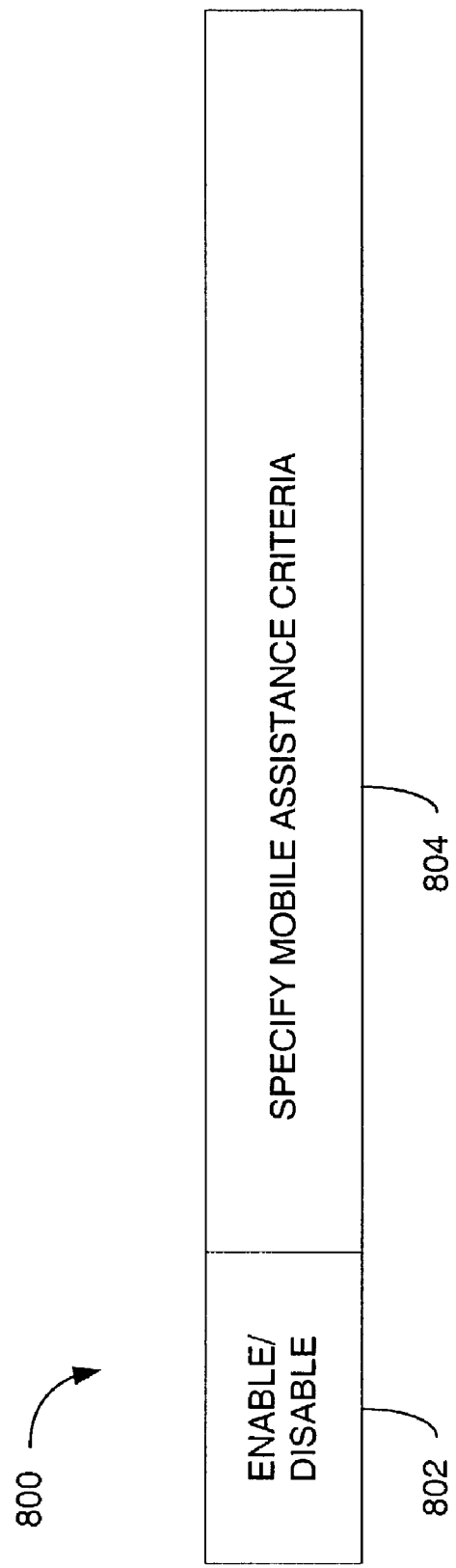
FIG. 10 is a block diagram of fields in a system parameters message.

The system parameters message according to one embodiment includes a mobile assistance criteria field. A code is used to select one of multiple criteria. In a first embodiment, the field is a one bit field that either enables or disables mobile assisted dormant handoff. In a second embodiment, the field is a multiple bit field that allows for different criteria to trigger the mobile node to identify a current location. In a third embodiment, a combination of the first and second, the field is a multiple bit field, wherein one bit enables or disables the mobile assisted handoff. When the bit indicates that mobile assisted handoff is enabled, then other bit(s) are used to indicate a mobile assistance criteria. For example, as illustrated in FIG. 10, field 800 includes a first field (or bit) 802 to enable or disable mobile-assisted handoff. When enabled, the mobile node sends an origination message, or some other location identifier, on change of packet zone. When disabled, the mobile node does not send a message on change of packet zone.

Note that according to one embodiment, the system may respond to the location identification from the mobile node by determining whether to establish the target path or maintain the serving path. The system may make such determination based on whether there are pending packet data communications for MN 308, system loading, historical packet data usage of MN 308, or any of a variety of system performance and operation criteria.

Continuing with FIG. 10, the field 800 includes a field 804 that identifies the mobile assistance criteria when mobile assistance is enabled in field 802. The mobile assistance criteria field 804 may specify the change criteria to trigger the mobile node to send a location identifier to the system.

Figure 9:
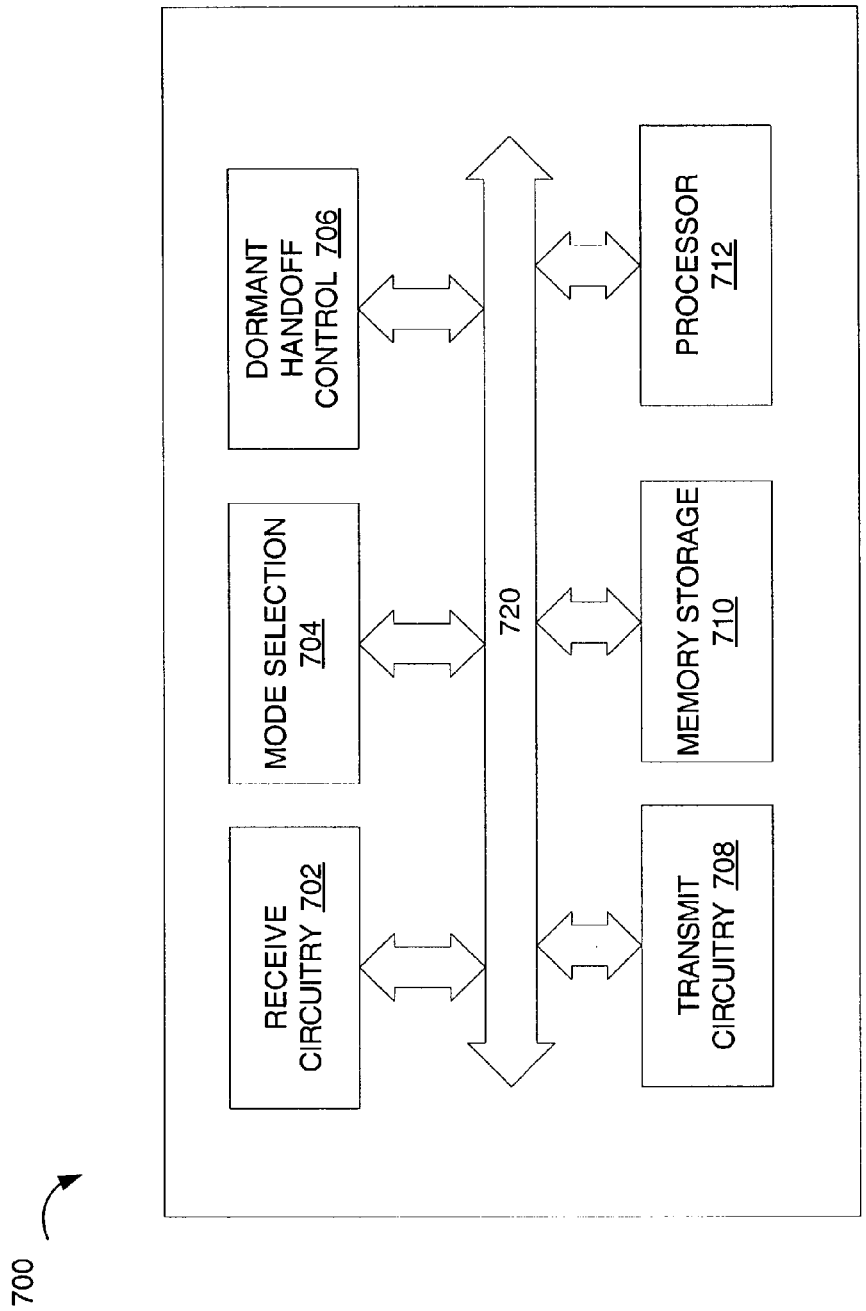
FIG. 9 is a mobile node.

A mobile node 700 capable of operation in one or multiple of the embodiments described hereinabove is illustrated in FIG. 9. The mobile node 700 includes a communication bus 720 coupled to multiple functional modules. The mobile node 700 includes receive circuitry 702 and transmit circuitry 704 for interfacing with the system via the radio link, OTA. A processor 712 controls operation of the mobile node 700, and operates to store and retrieve information from memory storage 710. Such information may include data, computer-readable instructions, etc. A mode selection unit 704 identifies triggers for placing mobile node 700 into one of several operating state. The mode selection unit 704 controls placing mobile node 700 into a dormant state and an active state with respect to packet data communication. A dormant handoff control unit 706 determines the proper operation while in the dormant state. In one embodiment, the dormant handoff control 706 determines such operation from the system parameters message received. In other words, the dormant operation is adaptive to the system and current condition. In another embodiment, the dormant handoff control 706 is predetermined and does not adapt to the system in response to the system parameters message.

The examples discussed hereinabove present methods for dormant handoff that avoids mobile assistance. Mobile-unassisted dormant handoff presents some challenges and provides some options for operation. Firstly, if the mobile node has moved to a new packet zone and the A8 connection still points to the serving PCF, packet data is first sent to the serving PCF. The target path is then established and packet data is sent to the mobile node via the target path. When packet data arrives at the mobile node, some packet(s), such as those forwarded to the serving PCF, may be lost. The amount of packet loss is proportional to the delay in updating the network connections. In the worst case, such delay includes the paging latency, time to set-up A8 connection with the target PCF, time to set-up A10 connection with the target PDSN, time to re-establish PPP, and time for Mobile IP re-registration. Thus there is the potential for inaccurate and incomplete packet data communications on change of packet zone.

Secondly, when a mobile node does not respond to the page message sent by the Serving BSC, the serving BSC requests the MSC to page the mobile node. In response, the MSC may initiate a flood page. Depending on the area covered by the MSC, the flood page area could be huge and, hence, consume excessive network resources. There is a tradeoff, therefore, between disabling mobile assisted dormant handoff and efficient, accurate operation of the system.

Still further, enabling mobile assisted dormant handoff introduces interference on the access channel, even when there is no packet data ready for communication with the mobile node. Whereas, disabling mobile assisted dormant handoff may cause packet loss, proportional to the time taken to setup the new A8 connection with the target PCF, and can consume network resources, especially, if flood paging is used to detect the position of the mobile. The service provider may therefore decide to select between assisted and unassisted dormant handoff to meet the requirements of a given system.

In one embodiment, the service provider enables mobile unassisted dormant handoff via the signaling messages. In this way, the signaling message, such as the system parameters message, will identify the criteria for a mobile node to send an origination message, or in some other way identify a location to the system. The criteria may be a change of SID, NID, and/or PZID, or some combination thereof. Typically, in mobile-assisted dormant handoff, the mobile node sends an origination message each time the PZID changes. The PZID is received in a system parameters message transmitted OTA by the BSC in each packet zone. The system parameters message could be enhanced to include a change of criteria. The mobile node would then be instructed, via the system parameters message, to send an origination message on a change of SID only, or on a change of NID and SID, etc.

According to another embodiment, the SID area is defined as the area served by one PDSN. In this way, packet losses are minimized, as the time delay in setting up the target path is less than that of establishing a target path through a new PDSN.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for a mobile node supporting packet data communications, comprising:
    entering a dormant mode of operation;
    receiving a system parameters message identifying a packet zone;
    determining a mobile assistance criteria for the dormant mode, wherein the mobile assistance criteria is identified by the system parameters message and comprises a multi-bit field in the system parameters message, wherein a bit in the multi-bit field is used to enable mobile-assisted handoff;
    if the mobile assistance criteria is met, transmitting a location identifier; and
    if the mobile assistance criteria is not met, ignoring the system parameters message while in the dormant mode of operation;
    receiving a page for a packet data communication; and
    responding to the page.

2. A method for a mobile node supporting packet data communications, comprising:
    entering a dormant mode of operation;
    receiving a system parameters message identifying a packet zone;
    determining a mobile assistance criteria for the dormant mode, wherein the mobile assistance criteria corresponds to a change in at least one of a plurality of packet zone identifiers;
    if the mobile assistance criteria is met, transmitting a location identifier; and
    if the mobile assistance criteria is not met, ignoring the system parameters message while in the dormant mode of operation;
    receiving a page for a packet data communication; and
    responding to the page.

3. A mobile node supporting packet data communications, comprising:
- means for entering a dormant mode of operation;
- means for receiving a system parameters message identifying a packet zone;
- means for determining a mobile assistance criteria for the dormant mode, wherein the mobile assistance criteria is identified by the system parameters message and comprises a multi-bit field in the system parameters message, wherein a bit in the multi-bit field is used to enable mobile-assisted handoff;
- means for transmitting a location identifier if the mobile assistance criteria is met;
- means for ignoring the system parameters message while in the dormant mode of operation if the mobile assistance criteria is not met;
- means for receiving a page for a packet data communication; and
- means for responding to the page.

4. A mobile node supporting packet data communications, comprising:
- means for entering a dormant node of operation;
- means for receiving a system parameters message identifying a packet zone;
- means for determining a mobile assistance criteria for the dormant mode, wherein the mobile assistance criteria corresponds to a change in at least one of a plurality of packet zone identifiers;
- means for transmitting a location identifier if the mobile assistance criteria is met; and
- means for ignoring the system parameters message while in the dormant mode of operation if the mobile assistance criteria is not met;
- means for receiving a page for a packet data communication; and
- means for responding to the page.

* * * * *